United States Patent
Ávila Gutiérrez

(10) Patent No.: US 10,164,351 B2
(45) Date of Patent: Dec. 25, 2018

(54) BONDING CLIP SHELL

(71) Applicant: AIRBUS OPERATIONS S.L., Getafe (ES)

(72) Inventor: Adolfo Ávila Gutiérrez, Getafe (ES)

(73) Assignee: Airbus Operations S.L., Getafe (ES)

( * ) Notice: Subject to any disclaimer, the term of this patent is extended or adjusted under 35 U.S.C. 154(b) by 0 days.

(21) Appl. No.: 15/651,587

(22) Filed: Jul. 17, 2017

(65) Prior Publication Data

US 2018/0019527 A1  Jan. 18, 2018

(30) Foreign Application Priority Data

Jul. 18, 2016  (EP) .................................... 16382341

(51) Int. Cl.

| | |
|---|---|
| *H01R 4/28* | (2006.01) |
| *H01R 4/48* | (2006.01) |
| *H01R 4/70* | (2006.01) |
| *H01R 13/50* | (2006.01) |
| *H01R 13/52* | (2006.01) |
| *H01R 13/627* | (2006.01) |
| *F16B 4/00* | (2006.01) |
| *B64C 1/00* | (2006.01) |

(52) U.S. Cl.
CPC ............... *H01R 4/70* (2013.01); *F16B 4/004* (2013.01); *H01R 4/48* (2013.01); *H01R 13/501* (2013.01); *H01R 13/5213* (2013.01); *H01R 13/6278* (2013.01); *B64C 1/00* (2013.01); *H01R 4/28* (2013.01); *H01R 2201/26* (2013.01)

(58) Field of Classification Search
CPC ... H01R 4/48; H01R 4/70; F16B 4/004; F16B 37/041; F16B 37/044; B60N 3/046

USPC .................. 439/92, 435, 725, 729, 835, 909
See application file for complete search history.

(56) References Cited

U.S. PATENT DOCUMENTS

| | | | | |
|---|---|---|---|---|
| 2,716,434 | A | * | 8/1955 | Crowther .............. F16B 37/044 411/106 |
| 3,704,739 | A | * | 12/1972 | Holton .................. F16B 37/041 411/103 |
| 4,086,679 | A | * | 5/1978 | Butler ................ A47G 27/0418 16/4 |
| 4,698,459 | A | * | 10/1987 | Drake .................. H01R 11/284 174/138 F |
| 4,981,443 | A |  | 1/1991 | Suverison et al. |

(Continued)

OTHER PUBLICATIONS

European Search Report, dated Nov. 16, 2016, priority document.

*Primary Examiner* — Edwin A. Leon
*Assistant Examiner* — Oscar Jimenez
(74) *Attorney, Agent, or Firm* — Greer, Burns & Crain, Ltd.

(57) ABSTRACT

A bonding clip shell for protecting a bonding point between a bonding lead and a bonding strap. The bonding clip shell comprises a first part which comprises a first end, a second end, and an inner surface, the inner surface comprising a protrusion and a first seal, and a second part which comprises a first end, a second end and an inner surface, the inner surface comprising a cavity and a second seal. In the first ends of the first and second parts respectively, the first and second parts are joined through a hinge area. The cavity is configured to house and fix the protrusion providing a click system. When the protrusion is housed in the cavity, the first and second seals are configured to hermetically seal the inner surfaces of the bonding clip shell.

18 Claims, 4 Drawing Sheets

(56) References Cited

U.S. PATENT DOCUMENTS

| | | | | |
|---|---|---|---|---|
| 5,131,856 A * | 7/1992 | Auclair | ............... | H01R 4/643 |
| | | | | 24/280 |
| 6,106,310 A * | 8/2000 | Davis | ............... | H01R 4/26 |
| | | | | 439/92 |
| 6,758,645 B2 * | 7/2004 | Curley, Jr. | ............... | F16B 37/044 |
| | | | | 411/107 |
| 7,326,069 B1 * | 2/2008 | Duesterhoeft | ............... | H01R 4/2433 |
| | | | | 439/395 |
| 7,763,807 B2 * | 7/2010 | Richter | ............... | H02G 3/14 |
| | | | | 174/138 F |
| 8,002,507 B2 * | 8/2011 | James | ............... | B64C 1/20 |
| | | | | 411/175 |
| 8,025,508 B2 * | 9/2011 | Parker | ............... | H01R 4/36 |
| | | | | 439/92 |
| 8,701,265 B1 | 4/2014 | James | | |
| 2005/0072077 A1 * | 4/2005 | Yoshii | ............... | E05F 11/385 |
| | | | | 52/204.5 |
| 2008/0017414 A1 * | 1/2008 | Puri | ............... | H05K 5/0247 |
| | | | | 174/560 |
| 2009/0272574 A1 * | 11/2009 | Richter | ............... | H01R 13/5202 |
| | | | | 174/548 |
| 2013/0012060 A1 * | 1/2013 | Xiao | ............... | H02G 3/16 |
| | | | | 439/535 |
| 2016/0082871 A1 * | 3/2016 | Kwon | ............... | F16B 2/22 |
| | | | | 16/6 |

\* cited by examiner

BONDING CLIP SHELL

CROSS-REFERENCES TO RELATED APPLICATIONS

This application claims the benefit of the European patent application No. 16382341.2 filed on Jul. 18, 2016, the entire disclosures of which are incorporated herein by way of reference.

FIELD OF THE INVENTION

The present invention belongs to the field of bonding elements, more particularly, to the field of bonding elements used in joints of an aircraft.

BACKGROUND OF THE INVENTION

In an aircraft, there are thousands of bonding leads that connect the pipes, harnesses equipment, or structure. These bonding points are intended to perform a different function, for example, a bonding point can electrically ground two structural elements. In all the cases, the installation process of a bonding point in an aircraft is quite similar Until know, the installation process of the bonding leads comprises the following steps:

a) preparing the surface to be installed, for example removing the paint.
b) cleaning the surface to be installed,
c) installing the electrical bonding,
d) applying an electrical test to the electrical bonding,
e) applying a surface protection, for example sealant and blue varnish
f) marking the installed bonding point.

Unfortunately, the large number of steps of the installation process leads to errors, and therefore, it requires that a highly experienced operator performs the installation process in each bonding point of the aircraft, increasing the cost of manufacture of the aircraft. However, due to the nature of the installation process (large number of the steps and large number of bonding points in an aircraft), even if a highly experienced operator performs the installation process, several errors may also occur.

Additionally, as an aircraft has thousands of bonding points, this installation process is not efficient and consumes a lot of time and resources, which finally increases the manufacturing cost of the aircraft.

Therefore, there is a need to find a device which makes easier and simpler the installation process of a bonding point in an aircraft, solving the problems of the state of the art.

SUMMARY OF THE INVENTION

In a first inventive aspect, the invention provides a bonding clip shell for protecting a bonding point between a bonding lead and a bonding strap, the bonding clip shell comprising, a first part which comprises a first end, a second end, and an inner surface, the inner surface comprising a protrusion and a first seal, a second part which comprises a first end, a second end and an inner surface, the inner surface comprising a cavity and a second seal, wherein the first and second parts are joined through a hinge area, the hinge area being formed by the first end of the first part and the first end of the second part, the cavity is configured to house and fix the protrusion providing a click system, and the first and second seals are configured to seal hermitically the inner surface of the bonding clip shell when the protrusion is housed in the cavity.

Throughout all this document, "a first part" and "a second part" will be understood as the first part of the bonding shell and the second part of the bonding shell respectively. In order to clarify, the expression could also be defined as "a first shell part" and "a second shell part" accordingly.

In the context of this invention, the first and second seals are configured to seal hermitically which means that the seals prevent to any liquid, gas or substance go inside the inner surface of the bonding clip shell. Therefore, the inner surface of the bonding clip shell is isolated.

In the context of this invention, a click system is a type of fastener wherein when the protrusion is housed in the cavity, the protrusion is fixed. The click system prevents any type of rotation or movement of the protrusion. The click system also implies that the insertion of the protrusion in the cavity is performed in one step, i.e., it is not necessary to screw any element, and with the mere insertion of the protrusion in the cavity, the protrusion is fixed.

The inner surface of the first part of the bonding clip shell is configured to house the bonding lead, and the inner surface of the second part of the bonding clip shell is configured to house the bonding strap. Thus, when the protrusion is housed in the cavity, the bonding point between the bonding strap and the bonding lead is sealed by means of the first and second seals.

In another embodiment, the inner surface of the first part of the bonding clip shell is also configured to house the bonding strap. In all configurations, the bonding strap and the bonding lead are connected to each other, providing an electrical connection for grounding electrical components.

Furthermore, as the cavity is configured to house and fix the protrusion providing a click system, advantageously, the bonding clip shell of the invention also allows a one shot installation and with only one hand, reducing drastically the time for installation of the bonding point.

Advantageously, the bonding clip shell provides a watertight sealed joint avoiding the corrosion of the joint once the bonding clip shell is installed. Additionally, the bonding clip shell of the invention avoids the application of specific surface protection, as sealant and blued varnish, reducing the cost of the installation.

In a particular embodiment, the outer surfaces of the first and second part are marked with an identification number. In another particular embodiment, the outer surfaces comprise a predetermined color which allows identifying the type of bonding point, for example the blue color means an electrical bonding point. Advantageously, this embodiment avoids performing the step of marking, reducing the installation time of the bonding point.

In a particular embodiment, the first seal is located in the periphery of the first part. In another particular embodiment, the second seal is located in the periphery of the second part. In a more preferred particular embodiment, the first seal and the second seal are located respectively in the periphery of the first part and in the periphery of the second part. Advantageously, these embodiments increase watertight protection of the bonding point.

In a particular embodiment, the first part further comprises a first sealing lip located in the periphery of the first part. In another particular embodiment, the second part further comprises a second sealing lip located in the periphery of the second part. In a more preferred embodiment, the first and second sealing lips are complementary to each other. In particular, the first and second sealing lips are L-shaped.

In the context of this invention, two elements are complementary when the shape of their faces fit together being both faces housed between each other.

Advantageously, the first and the second sealing lips and the first and the second seals provides a tight closure which protects the bonding point in a hazardous environment.

In a particular embodiment, the first part and the first sealing lip are a one-piece body. In another particular embodiment, the second part and the second sealing lip are a one-piece body. In a more preferred embodiment, the first part and the first sealing lip and the second part and the second sealing lip are respectively a one-piece body.

In a particular embodiment, the shape of the inner surface of the first part is complementary to the shape of the bonding lead. In another particular embodiment, the shape of the inner surface of the second part is complementary to the shape of the bonding strap. In another particular embodiment, the shape of the inner surface of the first part is complementary to the shape of the bonding strap.

In a particular embodiment, the shape of the inner surface of the first part is complementary to the shape of a terminal lug. In the context of this invention, a terminal lug is a type of metallic end in a bonding lead, which in turn is configured to house the protrusion fixing the bonding lead to the protrusion.

These embodiments reduce the thickness of the bonding clip shell, and advantageously, the bonding clip shell can be used in an environment wherein the bonding point is located in a reduced space. Furthermore, advantageously these embodiments improve the contact between the bonding lead and the bonding strap or/and the terminal lug and the bonding strap increasing the electrical connection for grounding electrical components.

In a particular embodiment, the second part comprises a spring system on the inner surface. In another particular embodiment, the cavity is configured to house the spring system, the spring system being located in the cavity. In a more particular embodiment, the spring system is a spring.

The spring system is configured to apply a force between the first part and the second part of the bonding clip shell, which surprisingly guaranties an adequate bonding contact between the bonding lead and a bonding strap, and absorbs the thickness tolerance of the bonding clip shell. Therefore, when the protrusion is housed in the cavity, the spring system is located around the protrusion. Advantageously, the spring system provides to the click system tension, improving the contact between the bonding lead and the bonding strap.

In a particular embodiment, the first and second parts are manufactured in plastic materials. Advantageously, the bonding clip shell made of plastic materials isolates the electrical connection for grounding electrical components.

In one embodiment of the invention, the shape of the protrusion is arrow-shaped and the shape of the cavity is complementary to the arrow-shaped protrusion.

In a second inventive aspect, the invention provides an aircraft comprising at least one bonding point with a bonding clip shell according to the first inventive aspect.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

Once an object of the invention has been outlined, specific non-limitative embodiments are described hereinafter.

Figure 1:
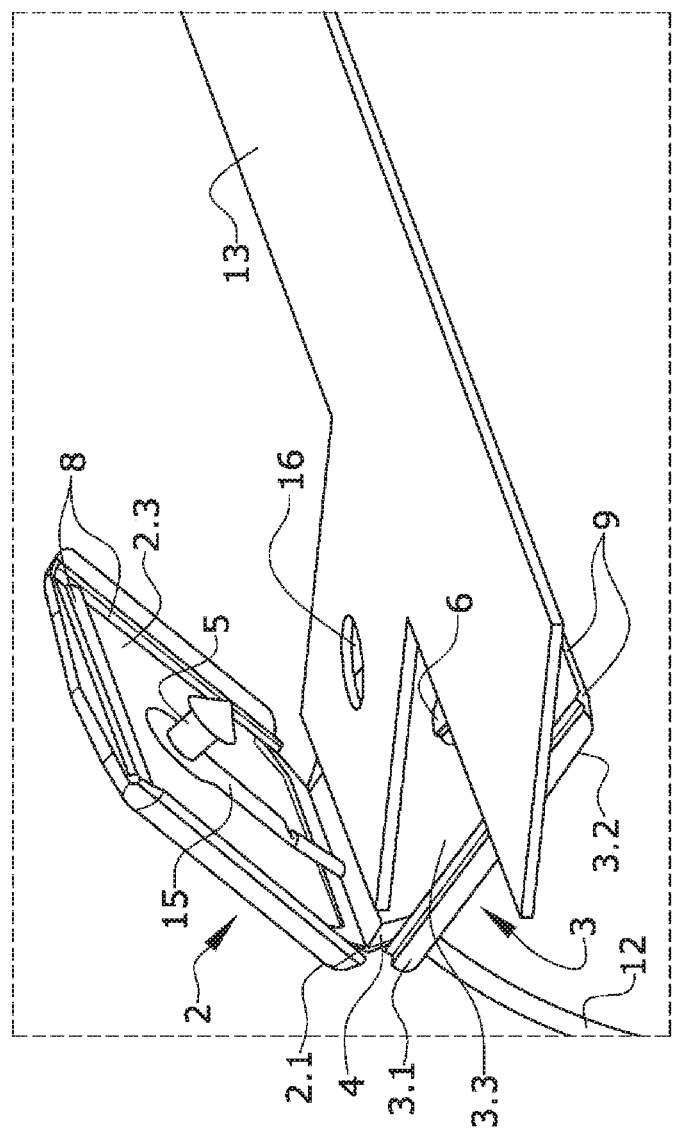
FIG. 1 shows a particular embodiment of the bonding clip shell of the invention.

FIG. 1 shows one embodiment of a bonding clip shell (1). The bonding clip shell (1) comprises a first part (2) and a second part (3). The first part (2) and the second part (3) comprise respectively first ends (2.1, 3.1) and second ends (2.2, 3.2). The first (2) and second (3) parts are joined through a hinge area (4). The hinge area (4) joins the first ends (2.1, 3.1) of the first (2) and second (3) parts respectively. In the embodiment shown in the FIG. 1, the hinge area (4) is formed by a local reduction of the seal thickness. Additionally, the second part (3) comprises a cavity (6) located in its inner surface (3.3). In this embodiment, all the components of the bonding shell (1) are made in a one-piece body, preferably in an injection molding plastic part.

Figure 2:
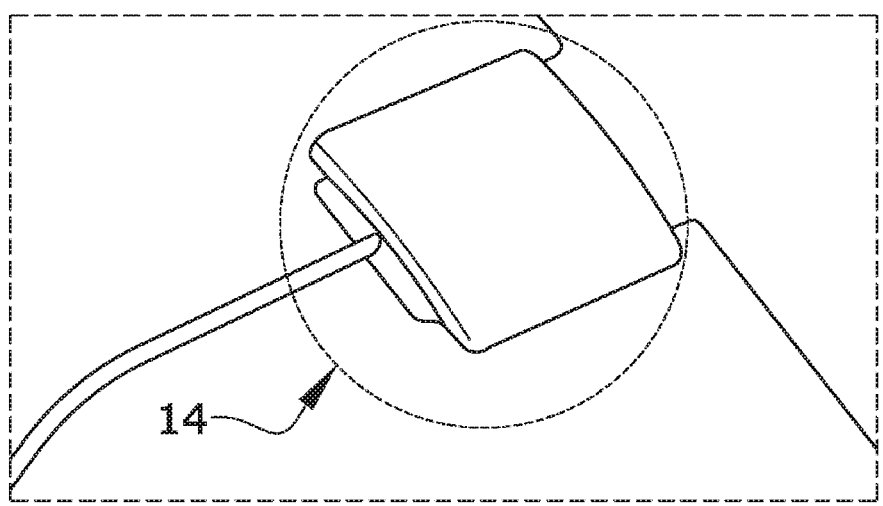
FIG. 2 shows a bonding point protected by the bonding clip shell of the invention.

FIG. 1 also shows an embodiment of the previous step of the installation process a bonding point. In particular, it is shown the previous step before the installation process of a metallic bonding lead (12) within a metallic bonding strap (13) that will lead to the bonding point (14). In FIG. 2, it is shown the bonding point (14) protected by the bonding clip shell (1) of the invention once the installation process has been performed.

In the embodiment of FIG. 1, the end of the bonding lead (12) comprises a terminal lug (15), and the bonding strap (13) comprises a through hole (16). The through hole (16) is configured to receive a protrusion (5) located in an inner surface (2.3) of the first part (2) of the bonding clip shell (1).

The bonding lead (12) with the terminal lug (15) is housed in the inner surface (2.3) of the first part (2) of the bonding clip shell (1), as it is shown in FIG. 1. In this embodiment, the shape of the inner surface (2.3) comprises two different sections shapes and a protrusion (5). The first section shape is complementary to the bonding lead (12) and the second section shape is complementary to the terminal lug (15). This configuration reduces the thickness of the bonding clip shell (1). Additionally, the terminal lug (15) comprises a through hole configure to receive the protrusion (5), increasing the fastening between the bonding lead (12) and the first part (2) of the bonding clip shell (1).

The bonding strap (13) is housed in the inner surface (3.3) of the second part (3) of the bonding clip shell (1), as it is shown in FIG. 1. In this embodiment, the shape of the inner surface (3.3) of the second part (3) is complementary to the shape of the bonding strap (13). Additionally, as it will be shown in FIG. 3, the through hole (16) of the bonding strap

(13) is located in the same position as the cavity of the inner surface (3.3) of the second part (3), and they are configured to receive the protrusion (5).

Additionally, as it is shown in FIG. 1, the first part (2) comprises a first seal (8) located in the periphery of the first part (2) and the second part (3) comprises a second seal (9) located in the periphery of the first part (2). The second part (2) also comprises a spring system on the inner surface (3.3) which it is not shown in FIG. 1.

In a particular example, the first (8) and second (9) seals are fluorosilicone or rubber seals, preferably, with a straight section.

Figure 3:
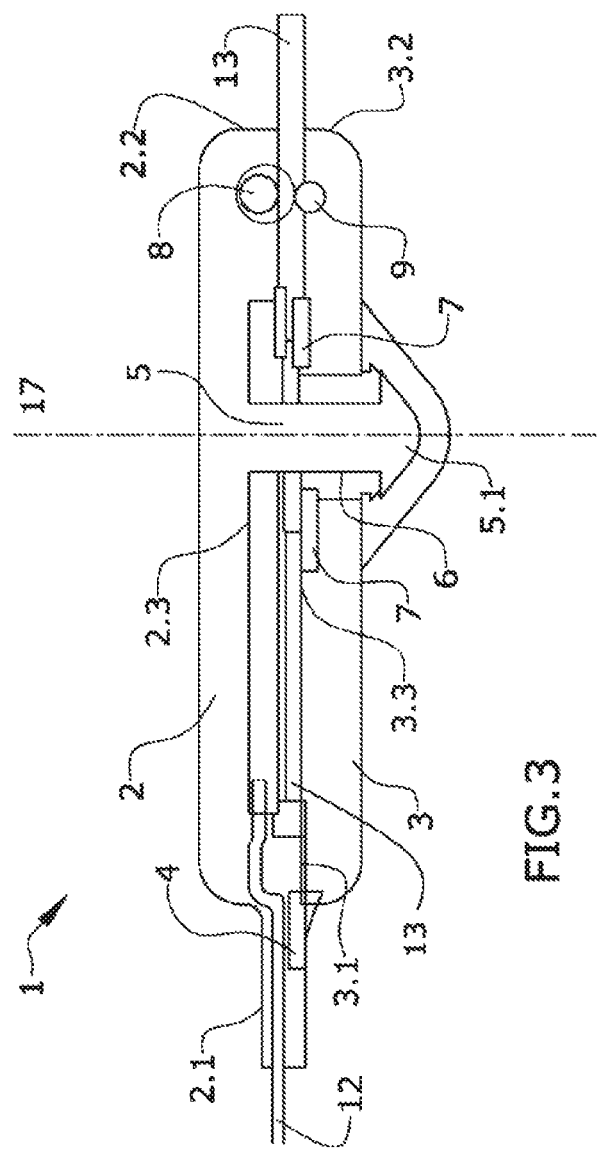
FIG. 3 shows a cross sectional view of the bonding clip shell of the invention.

FIG. 3 shows a cross sectional view of the bonding point (14) protected by the bonding clip shell (1). In particular, the protrusion (5) provides a click system (5.1) with an arrow shape which improves the junction of the bonding point (14). It can be appreciated that the bonding lead (12) and the bonding strap (13) are connected providing an electrical connection between them, and grounding electrically the bonding lead (12) and the bonding strap (13) when the bonding strap (13) is grounded. Also, it is shown that the spring system (7) is located on the inner surface (3.3). Additionally, it can be appreciated that the through hole (16) of the bonding strap (13) and the cavity (6) are aligned in the axis (17) defined by the protrusion (5).

Figure 4:
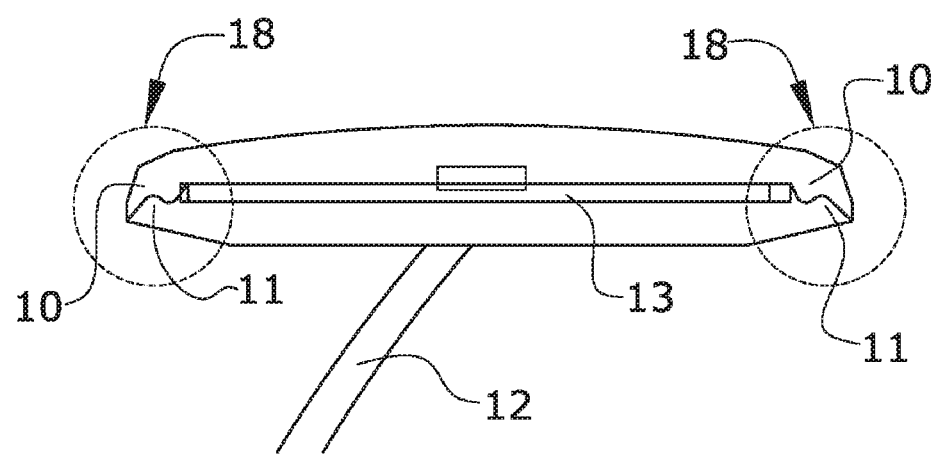
FIG. 4 shows a front cross sectional view of the bonding clip shell of the invention.

FIG. 4 shows a front cross sectional view of the bonding point (14) protected by the bonding clip shell (1). In particular, it is shown that the first part (2) and the second part (3) further comprise, respectively, a first and a second sealing lip (10, 11), being first and second sealing lips (10, 11) complementary (18) to each other. Advantageously, this configuration improves the watertight protection.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A bonding clip shell for protecting a bonding point between a bonding lead and a bonding strap, the bonding clip shell comprising: a first part which comprises a first end, a second end, and an inner surface, said inner surface of the first part comprising a protrusion and a first seal, a second part which comprises a first end, a second end and an inner surface, said inner surface of the second part comprising a cavity and a second seal, wherein the first and second parts are joined through a hinge area, the hinge area being formed by the first end of the first part and the first end of the second part, the cavity is configured to house and fix the protrusion, thereby forming a click system, and the first and second seals are configured to hermetically seal the inner surfaces of the bonding clip shell when the protrusion is housed in the cavity, and wherein when the protrusion is housed and fixed in the cavity, the protrusion extends beyond the second part, and wherein the protrusion is configured to receive both an end of the bonding lead and the bonding strap in order to house both of the end of the bonding lead and the bonding strap within the bonding clip shell.

2. The bonding clip shell according to claim 1, wherein the first seal is located in the periphery of the first part.

3. The bonding clip shell according to claim 1, wherein the second seal is located in the periphery of the second part.

4. The bonding clip shell according to claim 1, wherein the first part further comprises a first sealing lip located in the periphery of said first part.

5. The bonding clip shell according to claim 4, wherein the first part and the first sealing lip are a one-piece body.

6. The bonding clip shell according to claim 4, further comprising the second part comprising a second sealing lip located in the periphery of the second part, wherein the first and second sealing lips are complementary to each other.

7. The bonding clip shell according to claim 4, wherein the first and second sealing lips are L-shaped.

8. The bonding clip shell according to claim 1, wherein the second part further comprises a second sealing lip located in the periphery of the second part.

9. The bonding clip shell according to claim 8, wherein the second part and the second sealing lip are a one-piece body.

10. The bonding clip shell according to claim 1, wherein the shape of the inner surface of the first part is complementary to the shape of the bonding lead.

11. The bonding clip shell according to claim 1, wherein the shape of the inner surface of the first part is complementary to the shape of a terminal lug.

12. The bonding clip shell according to claim 1, wherein at least one of the shape of the inner surface of the second part is complementary to the shape of the bonding strap or the shape of the inner surface of the first part is complementary to the shape of the bonding strap.

13. The bonding clip shell according to claim 1, wherein the second part comprises a spring system on the inner surface.

14. The bonding clip shell according to claim 13, wherein the cavity is configured to house the spring system, and the spring system is located in the cavity.

15. An aircraft comprising at least one bonding point with a bonding clip shell according to claim 1.

16. A bonding clip shell for protecting a bonding point between a bonding lead and a bonding strap, the bonding clip shell comprising: a first part which comprises a first end, a second end, and an inner surface, said inner surface of the first part comprising a protrusion and a first seal, a second part which comprises a first end, a second end and an inner surface, said inner surface of the second part comprising a cavity and a second seal, wherein the first and second parts are joined through a hinge area, the hinge area being formed by the first end of the first part and the first end of the second part, the cavity is configured to house and fix the protrusion, thereby forming a click system, and the first and second seals are configured to hermetically seal the inner surfaces of the bonding clip shell when the protrusion is housed in the cavity, and wherein the protrusion has an arrow-shaped wherein the protrusion is configured to receive both an end of the bonding lead and the bonding strap in order to house both of the end of the bonding lead and the bonding strap within the bonding clip shell.

17. A bonding clip shell for protecting a bonding point between a bonding lead and a bonding strap, the bonding clip shell comprising: a first part which comprises a first end, a second end, and an inner surface, said inner surface of the first part comprising a protrusion and a first seal, a second part which comprises a first end, a second end and an inner surface, said inner surface of the second part comprising a cavity and a second seal, wherein the first and second parts are joined through a hinge area, the hinge area being formed by the first end of the first part and the first end of the second part, the cavity is configured to house and fix the protrusion, thereby forming a click system, and the first and second seals are configured to hermetically seal the inner surfaces of the bonding clip shell when the protrusion is housed in the cavity, and wherein the first seal is located in the periphery of the first part and the protrusion is within the periphery of the first part, and wherein the protrusion is configured to receive both an end of the bonding lead and the bonding strap in order to house the end of the bonding lead and bonding strap within the bonding clip shell.

18. The bonding clip shell according to claim 17, wherein the second seal is located in the periphery of the second part and the cavity is within the periphery of the second part.

\* \* \* \* \*